United States Patent
Matheaus et al.

(10) Patent No.: US 7,621,120 B2
(45) Date of Patent: Nov. 24, 2009

(54) HYBRID TECHNOLOGY FOR LEAN NOX TRAP AND PARTICULATE FILTER REGENERATION CONTROL

(75) Inventors: Andrew C. Matheaus, San Antonio, TX (US); Ryan C. Roecker, San Antonio, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 261 days.

(21) Appl. No.: 11/454,110

(22) Filed: Jun. 15, 2006

(65) Prior Publication Data

US 2007/0017215 A1  Jan. 25, 2007

Related U.S. Application Data

(60) Provisional application No. 60/690,599, filed on Jun. 15, 2005.

(51) Int. Cl.
*F01N 3/00* (2006.01)

(52) U.S. Cl. ............... 60/274; 60/280; 60/285; 60/286; 60/295; 60/301; 180/65.1; 180/65.3; 180/65.4; 180/65.6

(58) Field of Classification Search ............ 60/274, 60/277, 280, 285, 286, 295, 297, 301; 180/65.1, 180/65.2, 65.3, 65.4, 65.6, 165
See application file for complete search history.

(56) References Cited

U.S. PATENT DOCUMENTS

| | | | | |
|---|---|---|---|---|
| 5,323,868 A * | 6/1994 | Kawashima | ............... | 180/65.4 |
| 6,009,965 A * | 1/2000 | Takanohashi et al. | ...... | 180/65.2 |
| 6,079,204 A * | 6/2000 | Sun et al. | ...................... | 60/274 |
| 6,321,530 B1 * | 11/2001 | Hoshi et al. | ................... | 60/274 |
| 6,434,928 B1 * | 8/2002 | Manaka | ...................... | 60/274 |
| 6,718,758 B1 * | 4/2004 | Suzuki | ........................ | 60/300 |
| 6,912,848 B2 * | 7/2005 | Bedapudi | ..................... | 60/297 |
| 6,991,052 B2 * | 1/2006 | Nogi et al. | ............. | 180/65.235 |

\* cited by examiner

*Primary Examiner*—Binh Q. Tran
(74) *Attorney, Agent, or Firm*—Bakers Botts LLP

(57) ABSTRACT

A method for the use of hybrid technology to control lean NOx trap (LNT) and particulate filter regenerations using an electric motor wherein for the LNT (a) the electric motor is adapted to absorb torque excursions of the engine during regeneration of the LNT, (b) wherein the electric motor is adapted to add torque to thereby reduce the air required in the engine and to thereby reduce the amount of fuel needed to regenerate the LNT, or (c) both (a) and (b), or wherein for the particulate filter the electric motor is (a) adapted to load the engine to thereby increase the exhaust temperature to thereby facilitate regeneration of the particulate filter, (b) adapted to use a power source for the electric motor to power an electrically powered particulate filter regeneration unit to thereby facilitate regeneration of the particulate filter, or (c) both (a) and (b).

5 Claims, 1 Drawing Sheet

HYBRID TECHNOLOGY FOR LEAN NOX TRAP AND PARTICULATE FILTER REGENERATION CONTROL

This application claims priority to U.S. provisional application Ser. No. 60/690,599, filed Jun. 15, 2005, incorporated in its entirety herein by reference.

BACKGROUND OF THE INVENTION

Hybrid engine technology has demonstrated the capability of reducing emissions by capturing energy during braking that would otherwise be lost. Hybrid technology has also demonstrated the capability of supplementing the engine power with additional torque response.

Application of exhaust aftertreatment systems, namely lean NOx trap (LNT) and particulate filters, requires specific control to regenerate these devices.

LNT aftertreatment systems require regular regeneration (e.g., up to one regeneration every 30 seconds). Regeneration requires that the gases delivered to the LNT be nearly free of oxygen. Historically, lean burn engines utilized exhaust-side supplemental fuel injection systems to reduce excess oxygen upstream of the LNT. From an efficiency standpoint, the supplemental fuel was wasted, as it did not contribute to engine output power. In-cylinder supplemental fuel injection is another method of supplying reductant to the LNT, but during the transition from lean to rich (and the return), excursions in engine power occur and are difficult to tune out. These excursions can perpetuate through the drivetrain and cause vehicle operating changes.

Particulate filters, catalyzed or not, increase the pressure drop across the units as they become loaded. The filters are normally regenerated when exhaust temperatures are high enough to oxidize the collected soot and hydrocarbons. There may be cases of extended light-load operation in which the exhaust temperatures are too low for regeneration to occur. Therefore, the pressure drop across the particulate filter increases greatly. Manufacturers are looking for active ways to regenerate the particulate filters.

SUMMARY OF THE INVENTION

This invention provides a solution to one or more of the problems and deficiencies discussed above.

The system of this invention allows control of engine and aftertreatment systems during LNT and particulate filter regenerations. This invention includes active control of torque excursions during LNT regeneration and reduction of fuel consumption during LNT regeneration at some operating conditions through the use of a hybrid system that can either absorb excursions (e.g., surges) that may arise when running a normally lean diesel engine under rich fuel conditions to facilitate LNT regeneration, or can add energy to the system to increase torque to thereby reduce air flow requirements and as a result reduce or eliminate the additional fuel needed for regeneration.

In one broad respect, this invention is a process for regenerating a LNT, comprising: providing an engine that is coupled to a transmission and to an electric motor, wherein exhaust from the engine enters a LNT; running the engine in a fuel rich mode for regeneration of the LNT; and (a) using the electric motor to absorb torque excursions during the LNT regeneration, (b) using the electric motor to add torque to thereby reduce the air required in the engine and to thereby reduce the amount of fuel needed to regenerate the LNT, or (c) both (a) and (b). In certain embodiments, the engine is a diesel engine; (a) is used alone, (b) is used alone; (c) is used; the electric motor is sandwiched between the engine and the transmission; the electric motor is coupled to a gearbox which is sandwiched between the engine and the transmission; and combinations thereof. The amount of torque used for a given system will depend on a variety of factors such as the desired effect (e.g., use of (a) or (b)), type of engine, extent of fuel rich mode, amount of torque excursions desired to be absorbed, extent of fuel reduction desired, and so on. These and other factors are readily apparent to one of skill in the art.

In another broad respect, this invention is a hybrid system for an engine, comprising: a engine coupled to an electric motor and to a transmission, and a LNT for receiving exhaust from the engine, wherein the electric motor is adapted to absorb torque excursions of the engine during regeneration of the LNT, (b) wherein the electric motor is adapted to add torque to thereby reduce the air required in the engine and to thereby reduce the amount of fuel needed to regenerate the LNT, or (c) both (a) and (b).

In another broad respect, this invention is a process for regenerating a particulate filter, comprising: providing a engine that is coupled to an electric motor and to a transmission, wherein exhaust from the engine enters a particulate filter; and (a) using the electric motor to load the engine to thereby increase the exhaust temperature to thereby facilitate regeneration of the particulate filter, (b) using a power source for the electric motor to power an electrically powered particulate filter regeneration unit to thereby facilitate regeneration of the particulate filter, or (c) using both (a) and (b). In certain embodiments, the engine is a diesel engine; (a) is used alone, (b) is used alone; (c) is used; the electric motor is sandwiched between the engine and the transmission; the electric motor is coupled to a gearbox which is sandwiched between the engine and the transmission; and combinations thereof. The amount of torque used for a given system will depend on a variety of factors such as the desired effect (e.g., use of (a) or (b)), type of engine, extent of load on the engine desired, amount of power desired to assist in particulate filter regeneration, desired temperature of the exhaust, and so on. These and other factors are readily apparent to one of skill in the art.

In another broad respect, this invention is a hybrid system for an engine, comprising: an engine coupled to an electric motor and to a transmission, and a particulate filter for receiving exhaust from the engine, wherein the electric motor is (a) adapted to load the engine to thereby increase the exhaust temperature to thereby facilitate regeneration of the particulate filter, (b) to use a power source for the electric motor to power an electrically powered particulate filter regeneration unit to thereby facilitate regeneration of the particulate filter, or (c) both (a) and (b).

In another broad respect, this invention is a process for manufacturing a hybrid system for an engine, comprising: coupling an engine to an electric motor and to a transmission, wherein a LNT receives exhaust from the engine, wherein (a) the electric motor is adapted to absorb torque excursions of the engine during regeneration of the LNT, (b) wherein the electric motor is adapted to add torque to thereby reduce the air required in the engine and to thereby reduce the amount of fuel needed to regenerate the LNT, or (c) both (a) and (b).

In another broad respect, this invention is a process for manufacturing hybrid system for an engine, comprising: coupling an engine to an electric motor and to a transmission, wherein a particulate filter receives exhaust from the engine, wherein the electric motor is (a) adapted to load the engine to thereby increase the exhaust temperature to thereby facilitate regeneration of the particulate filter, (b) to use a power source for the electric motor to power an electrically powered particulate filter regeneration unit to thereby facilitate regeneration of the particulate filter, or (c) both (a) and (b).

The operation of a diesel engine, conditions and procedures for regeneration of a LNT, conditions and procedures for regeneration of a particulate filter, and coupling of an electric motor to form a hybrid system are well known.

The benefits of this invention include but are not limited to the following. The hybrid system can minimize the effect of aftertreatment system regeneration (LNT or particulate trap) on power output to the vehicle transmission and/or drive wheels, thus minimizing driver perception of the regeneration. Additionally, the hybrid system allows engine operation at favorable conditions for aftertreatment system regeneration, while the electrical-side of the hybrid power system maintains vehicle driveability, overall power and feel. Additionally, the hybrid system can provide electrical power for alternative regeneration strategies such as electrical heating and/or microwave.

DETAILED DESCRIPTION OF THE INVENTION

Figure 1:
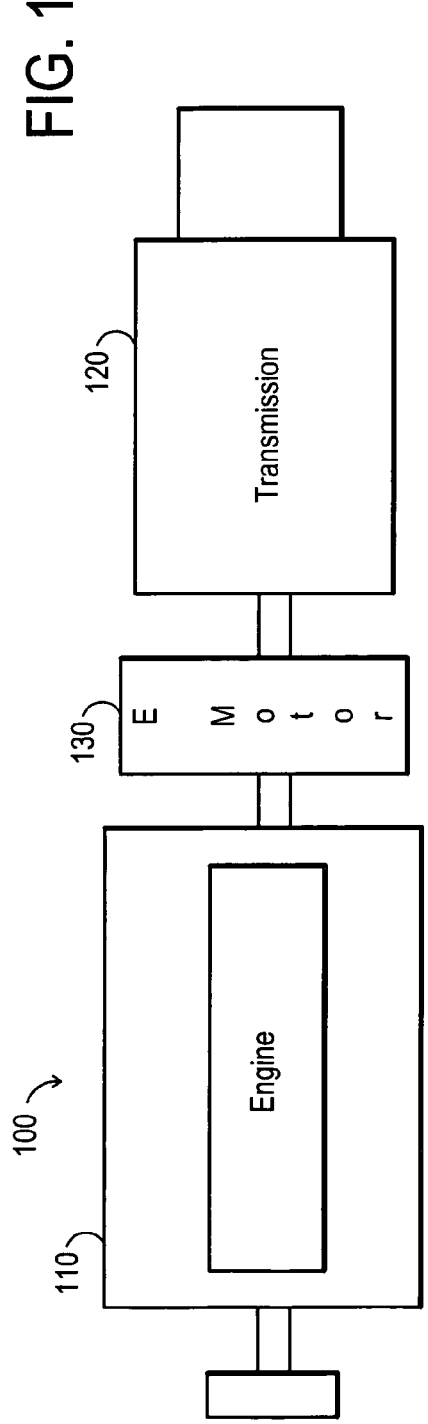
FIG. 1 illustrates a hybrid system of this invention with an integrated flywheel/motor or electric motor sandwiched between the engine and the transmission.

The hybrid system of this invention comprises an engine such as a diesel engine coupled to an electric motor so that the output shaft going to the transmission carries the load of the engine and electric motor. The hybrid system can either be in an integrated flywheel motor/generator or sandwiched between the motor and transmission. Thus as shown in FIG. 1, the hybrid system 100 can include an engine 110, a transmission 120, and an electric motor 130 sandwiched between the engine 110 and the transmission. For simplicity, FIG. 1 does not show either a LNT or particulate filter that would be part of the exhaust assembly that connects to the engine. The system can further include connections for the electric motor to a battery or other power source, and related details that would be incorporated into the system as is well known to one of skill in the art.

Figure 2:
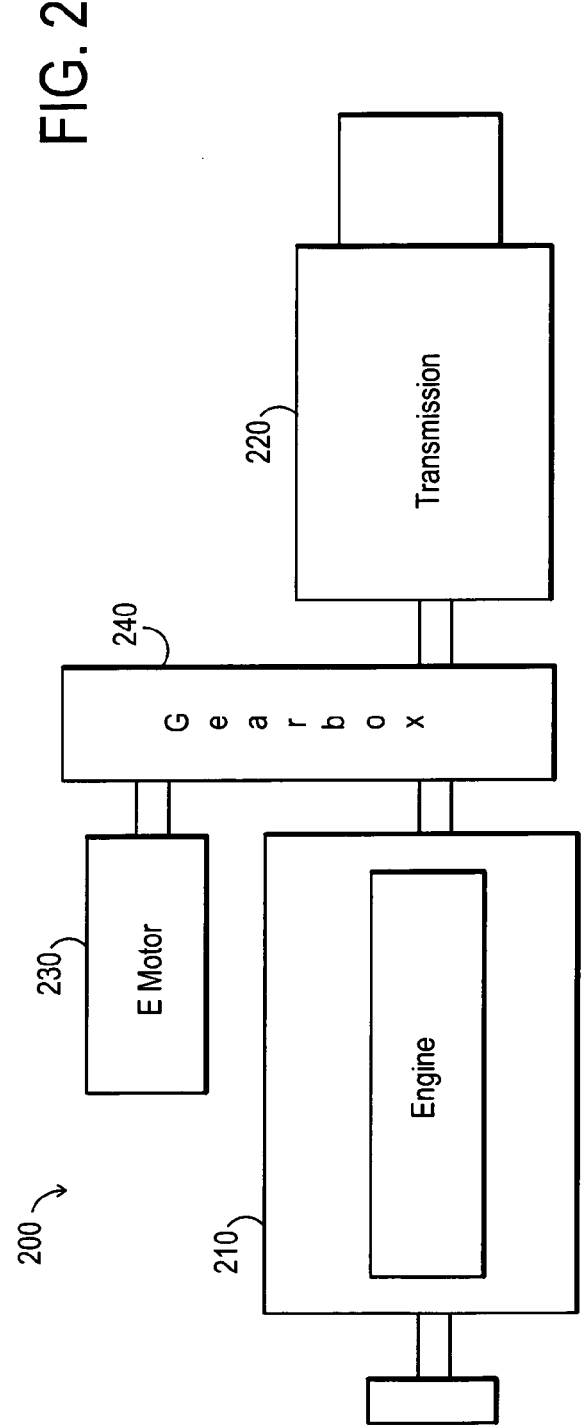
FIG. 2 illustrates a hybrid system of this invention where an electric motor is coupled to a gearbox between the engine and the transmission, whereby the gearbox integrates the electric motor into the system.

The hybrid system can also be added to the system through a gearbox to allow the use of higher speed electric motors as shown in FIG. 2. Here, the hybrid system 200 includes an engine 210, a transmission 220, and a gearbox 240 sandwiched between the engine 210 and the transmission 220. The electric motor 230 couples to the gearbox in this configuration. It should be appreciated that the electric motor can be connected to the transmission or engine by any means, either directly or indirectly, including by way of a belt drive, gear box or other gearing, and so on.

The configurations shown in FIGS. 1 and 2, and other configurations, can be used in connection with regeneration of a LNT, a particulate filter, or a LNT and a particulate filter.

Through the use of torque sensors and/or models, as are well known to one of skill in the art, feedback can be provided to the electric motor to dampen out the torque oscillations caused by LNT regeneration (switching from rich to lean and back again). Software can be readily obtained to monitor the system and actuate the electric motor appropriately. The hybrid system can maintain a target torque into the transmission by either absorbing or providing energy to the system.

During LNT regeneration at certain operating conditions, it can be beneficial to provide significant input from the electrical motor so that the load of the combustion engine can be reduced. This provides an immediate fuel consumption savings due to the reduced load on the combustion engine. As the combustion engine load is reduced, the airflow requirements are also reduced. In addition, at lighter loads, the combustion engine can be throttled even more while maintaining combustion stability. The combined effect of reducing airflow subsequently reduces the amount of fuel required to complete the LNT regeneration (to operate rich).

Active regeneration of a particulate filter is required chiefly because the exhaust temperatures are too low for natural regeneration. The hybrid system can be employed to load the combustion energy to produce and store electrical energy. The higher load on the combustion engine will increase exhaust temperatures in order to allow regeneration of the particulate filter. The electrical energy can be used to supplement the power requirements at a later time.

Electrically powered particulate filter strategies such as, but not limited to electrical resistance heaters and microwave technology, can be used for active heating of the exhaust and/or substrate to initiate particulate filter regeneration. These technologies are electrically energy intensive. The availability of a large electrical power source, the generator and energy storage media, make these electrically driven regeneration strategies a more viable option.

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A process for regenerating an LNT and a particulate filter, both installed on the exhaust line of an internal combustion engine, comprising:
   coupling an electric motor/generator to the engine such that the engine may load both the motor/generator and a transmission, and such that the motor/generator may either load the transmission or store energy in a battery;
   during LNT regeneration, performing the following steps:
       determining a rich air-fuel ratio for the engine;
       offloading the engine by increasing the torque input to the transmission from the motor/generator; and
       reducing the flow of air to the engine and determining a fuel input amount, thereby achieving the rich air-fuel ratio; and
   during particulate filter regeneration, performing the following steps: increasing the exhaust temperature by loading the engine with both the transmission and the motor/generator; and
   storing electrical energy from the motor/generator provided from the preceding step.

2. The process of claim 1, wherein the engine is a diesel engine.

3. The process of claim 1, wherein the electric motor is coupled to a gearbox which is sandwiched between the engine and the transmission.

4. The process of claim 1, further comprising using an active heating device to heat the exhaust during regeneration of the particulate filter.

5. The process of claim 1, further comprising using an active heating device to heat the particulate filter substrate during regeneration of the particulate filter.

\* \* \* \* \*